United States Patent
Ishida et al.

(10) Patent No.: US 8,234,712 B2
(45) Date of Patent: Jul. 31, 2012

(54) EXECUTABLE CONTENT FILTERING

(75) Inventors: Ai Ishida, Yamato (JP); Todd E. Kaplinger, Raleigh, NC (US); Satoshi Makino, Fujisawa (JP); Masayoshi Teraguchi, Yokohama (JP); Naohiko Uramoto, Yokohoma (JP)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 12/101,632

(22) Filed: Apr. 11, 2008

(65) Prior Publication Data
US 2009/0260087 A1 Oct. 15, 2009

(51) Int. Cl.
*G06F 7/04* (2006.01)
(52) U.S. Cl. .............. 726/26; 726/22; 726/25; 713/176; 713/187; 713/190; 713/189
(58) Field of Classification Search .................. 713/176, 713/190, 189, 187; 380/208, 42; 726/22–25
See application file for complete search history.

(56) References Cited

U.S. PATENT DOCUMENTS

| | | | |
|---|---|---|---|
| 6,199,081 B1 * | 3/2001 | Meyerzon et al. | 715/210 |
| 6,671,853 B1 * | 12/2003 | Burkett et al. | 715/235 |
| 7,308,648 B1 * | 12/2007 | Buchthal et al. | 715/234 |
| 7,373,519 B1 * | 5/2008 | Nachenberg et al. | 713/187 |
| 7,870,610 B1 * | 1/2011 | Mitchell et al. | 726/23 |
| 2003/0212818 A1 * | 11/2003 | Klein et al. | 709/238 |
| 2007/0039053 A1 * | 2/2007 | Dvir | 726/24 |
| 2008/0228928 A1 * | 9/2008 | Donelli et al. | 709/228 |
| 2009/0328185 A1 * | 12/2009 | Berg et al. | 726/13 |

* cited by examiner

*Primary Examiner* — Krisna Lim
(74) *Attorney, Agent, or Firm* — DeLizio Gilliam, PLLC (57) ABSTRACT

A method, apparatus, and machine-readable medium to implement executable content filtering is disclosed. According to a one example embodiment, a method is provided which comprises analyzing a stream of one or more parsed elements of a network message with a set of one or more executable content filters, wherein the stream of one or more elements are streamed from a network message parser. The described method embodiment further comprises modifying the stream of one or more parsed elements to disable executable content in the network message based, at least in part, on a set of one or more rule sets being applied with the set of one or more executable content filters to the stream of parsed elements.

20 Claims, 6 Drawing Sheets

EXECUTABLE CONTENT FILTERING

BACKGROUND

Embodiments of the inventive subject matter generally relate to the field of network communications, and, more particularly, to filtering network messages.

As Web 2.0 sites have become more prevalent, there has been an increased opportunity for end users to contribute content that is made immediately available to a wide audience of users. Since not all users can be trusted to provide safe content, the increased opportunity is accompanied by an increased need to limit the types of information that can be posted by users, such as code injection. The typical way to inject code is to hide code in a request parameter.

SUMMARY

Embodiments include a method that analyzes a stream of one or more parsed elements of a network message with a set of one or more executable content filters. The stream of one or more elements is streamed from a network message parser. The stream of one or more parsed elements are modified to disable executable content in the network message based, at least in part, on a set of one or more rule sets being applied with the set of one or more executable content filters to the stream of parsed elements.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer defining a scope for a rule set, embodiments can define multiple scopes for a rule set and even define a scope for disabling a rule set. In other instances, well-known instruction instances, protocols, structures and techniques have not been shown in detail in order not to obfuscate the description.

Malicious executable content in network messages (e.g., request and response hypertext transfer protocol message) can circumvent some security measures. In addition, conventional security measures aimed at capturing malicious executable content noticeably impact system performance. Stream based filtering of network messages allows for efficient processing to remove malicious executable content. Furthermore, an extensible framework for executable content filtering streaming message elements allows for efficient adaptation of an executable content filter to new threats disguised as executable content.

Figure 1:
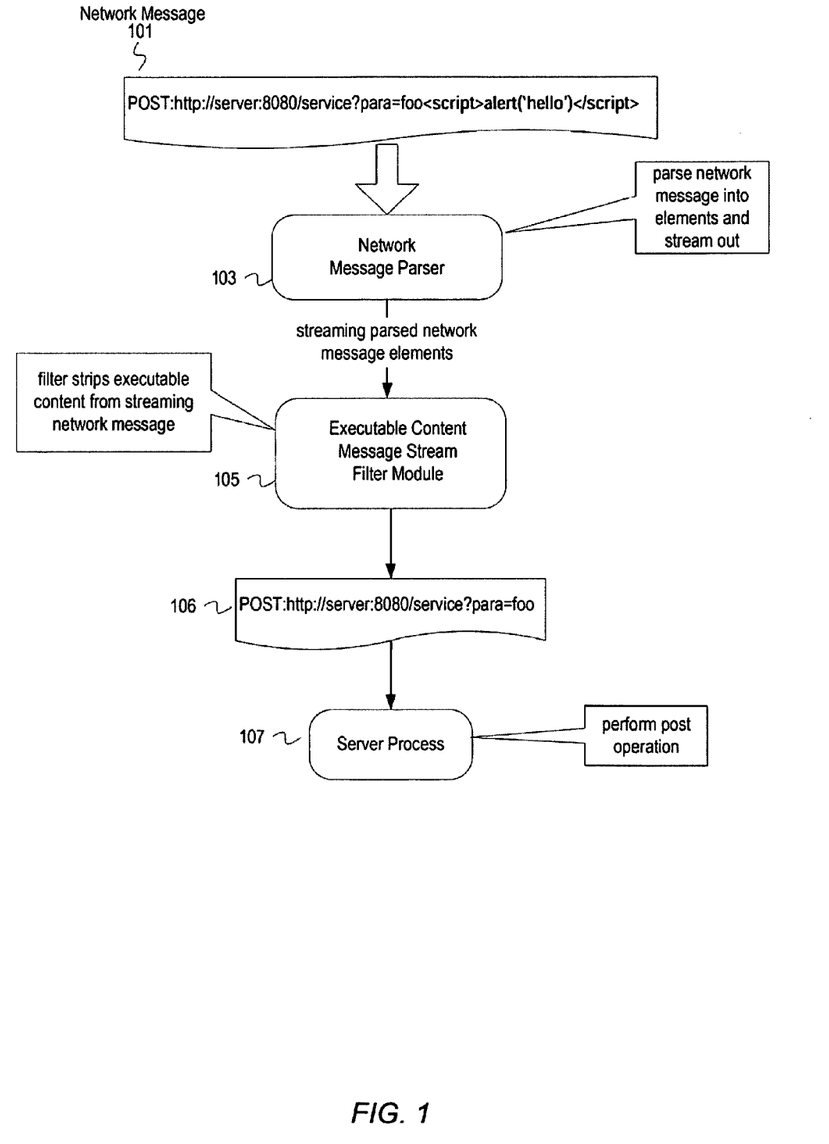
FIG. 1 depicts a conceptual example of executable content filtering of a request message.

FIG. 1 depicts a conceptual example of executable content filtering of a request message. A network message 101 is a request message in FIG. 1. The network message 101 includes the request "POST:http://server:8080/service?para=foo<script>alert('hello')</script>." Executable content is marked by the <script> tags. A network message parser 103 (e.g., a SAX parser, a StAX parser, etc.) receives the network message 101 and parses the network message 101 into elements. Examples of a parsed element include a tag, parameter, a message attribute, attribute value, the entire request command, etc. The network message parser 103 streams out the parsed elements of the network message 101 to an executable content message stream filter module 105. The executable content message stream filter module 105 analyzes each parsed element and strips particular executable content from the stream of parsed network message elements. In this example, the executable content message stream filter module 105 removes "<script>alert('hello')</script>" from the network message 101. A server process 107 receives a filtered network message 106 from the executable content message stream filter module 105. The filtered network message 106 indicates "POST:http://server:8080/service?para=foo." The server process 107 performs the POST operation indicated in the request network message 101.

It should be understood that FIG. 1 depicts an example and should not be used to limit claim scope and/or embodiments. For instance, embodiments may perform the POST operation and then pass the parameters to a message parser.

Figure 2:
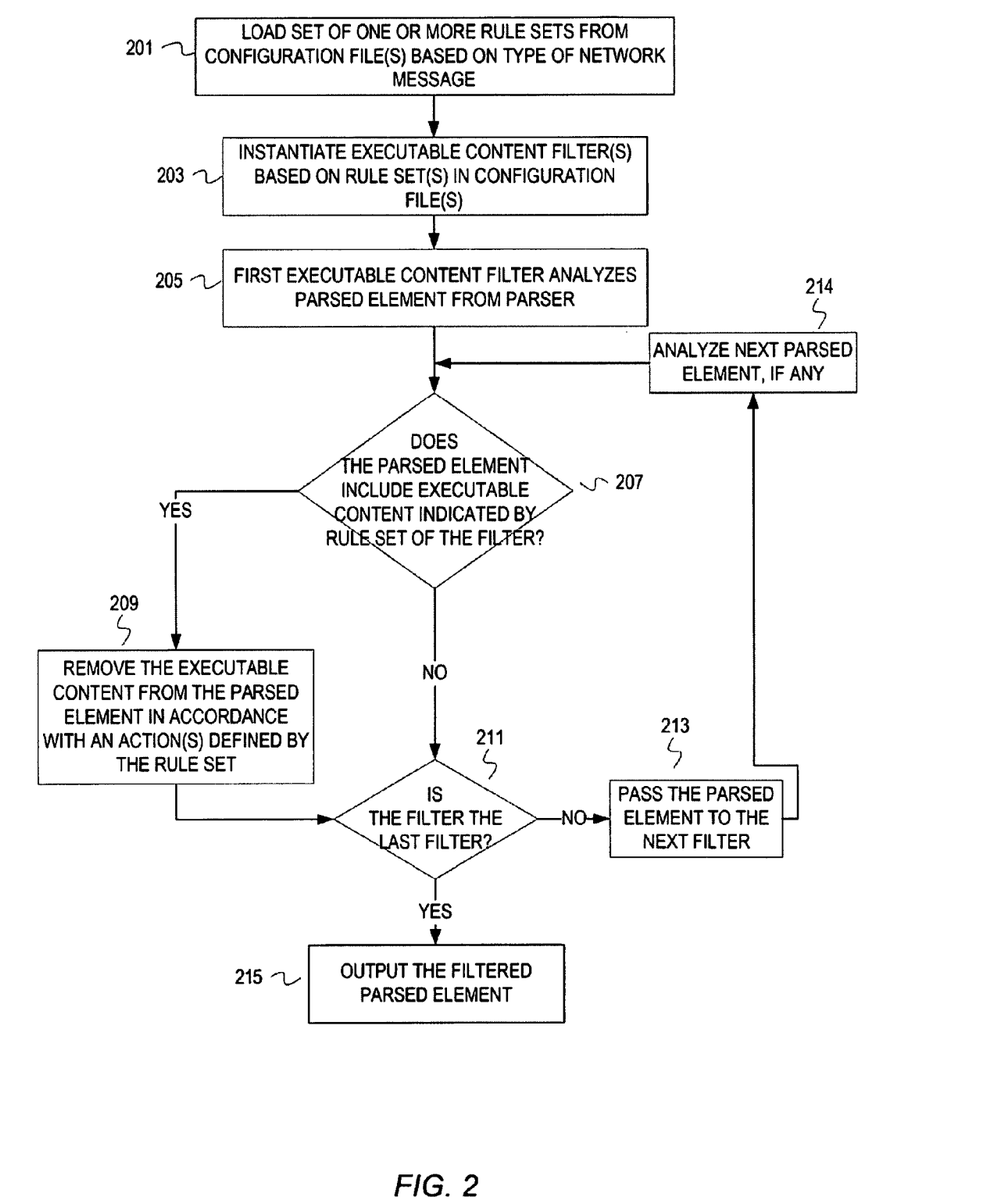
FIG. 2 depicts a flowchart of example operations for executable content filtering of streaming parsed elements.

FIG. 2 depicts a flowchart of example operations for executable content filtering of streaming parsed elements. At block 201, a set of one or more filtering rule sets are loaded from a configuration file(s) based on a type of network message. For example, a different configuration files can be defined for response type messages and request type messages. A configuration file for a request type network message can include the following:

```
<acf-config>
    <rule-set name="ruleset1">
        <filter attribute='param1' value='javascript' value-criterion='contains' action='remove-attribute-value' />
        ...
    </rule-set>
    <rule-set name="ruleset2"> </rule-set>
    ...
</acf-config>
```

This example request message configuration file defines two different rule sets, "ruleset1" and "ruleset2." A filter implementing ruleset1 will search for "param1" and determine if param1 contains a value "javascript." If javascript is found in param1 of a request message, then the implementing filter will perform the defined action, which is to remove the attribute value.

A configuration file for a response type network message can include the following:

```
<acf-config>
    <rule-set name="ruleset1" scope="/html/body">
        <filter attribute='on' attribute-criterion='starts-with'
```

-continued

```
           action='remove-attribute-value' />
         <filter attribute='href' value='javascript' value-criterion='starts-with'
    action='remove-attribute-value' />
           <filter attribute='src' value='javascript' value-criterion='starts-
    with' action='remove-attribute-value' />
         <filter tag='iFrame' action='remove-tag'/>
         <filter tag='applet' action='remove-tag' />
         <filter tag='script' action='remove-tag' />
      ...
      </rule-set>
      <rule-set name="ruleset2" scope="/html/header">
    ...
      </rule-set>
    </acf-config>
```

This example response message configuration file also defines two different rule sets, "ruleset1" and "ruleset2." The example rule sets target a particular scope within a response type network message, but scope will be discussed later with respect to FIG. 4. A filter implementing ruleset1 will filter on various executable content in accordance with the different filters rules defined for ruleset1. The filter will search for an attribute that starts with "on" and remove the attribute value. The filter will search for "href" or "src" attribute that starts with javascript, and remove the attribute value. The filter implementing ruleset1 will also remove executable content corresponding to the tags "iFrame," "applet," and "script." Other examples of tags to be filtered for executable content include "embed," "object," and "style."

At block 203, an executable content filter(s) is instantiated based on the one or more rule sets loaded from the configuration file(s). For instance, a thread or process is instantiated for each rule set defined in the configuration file(s). In another example, a single process or thread is spawned as an executable content filter that reads and implements all rule sets.

At block 205, a first executable content filter analyzes a parsed element output from a parser. The streaming of parsed elements from a message parser can utilize different techniques (e.g., push model, pull model, a hybrid of the push and pull models, etc.).

At block 207, it is determined if the parsed element includes executable content indicated by a rule set implemented by the filter. If the parsed element includes executable content indicated by the rule set implemented by the filter, then control flows to block 209. If the parsed element does not include executable content indicated by the rule set implemented by the filter, then control flows to block 211.

At block 209, the executable content is removed from the parsed element in accordance with an action(s) defined by the rule set. A rule set may cause the executable content filter to remove an attribute value, remove tags and all content enclosed by the tags, replace an attribute value, etc. Control flows from block 209 to block 211.

At block 211, it is determined if the executable content filter is the last executable content filter. If the executable content filter is the last filter, then control flows to block 215. Otherwise, control flows to block 213.

At block 213, the parsed element is passed to the next executable content filter. At block 214, the next parsed element is analyzed. Control flows from block 214 to block 207.

At block 215, the parsed element is output. The parsed element may be processed for rendering, processed to determine a service to call, processed to perform an operation, etc.

Figure 3:
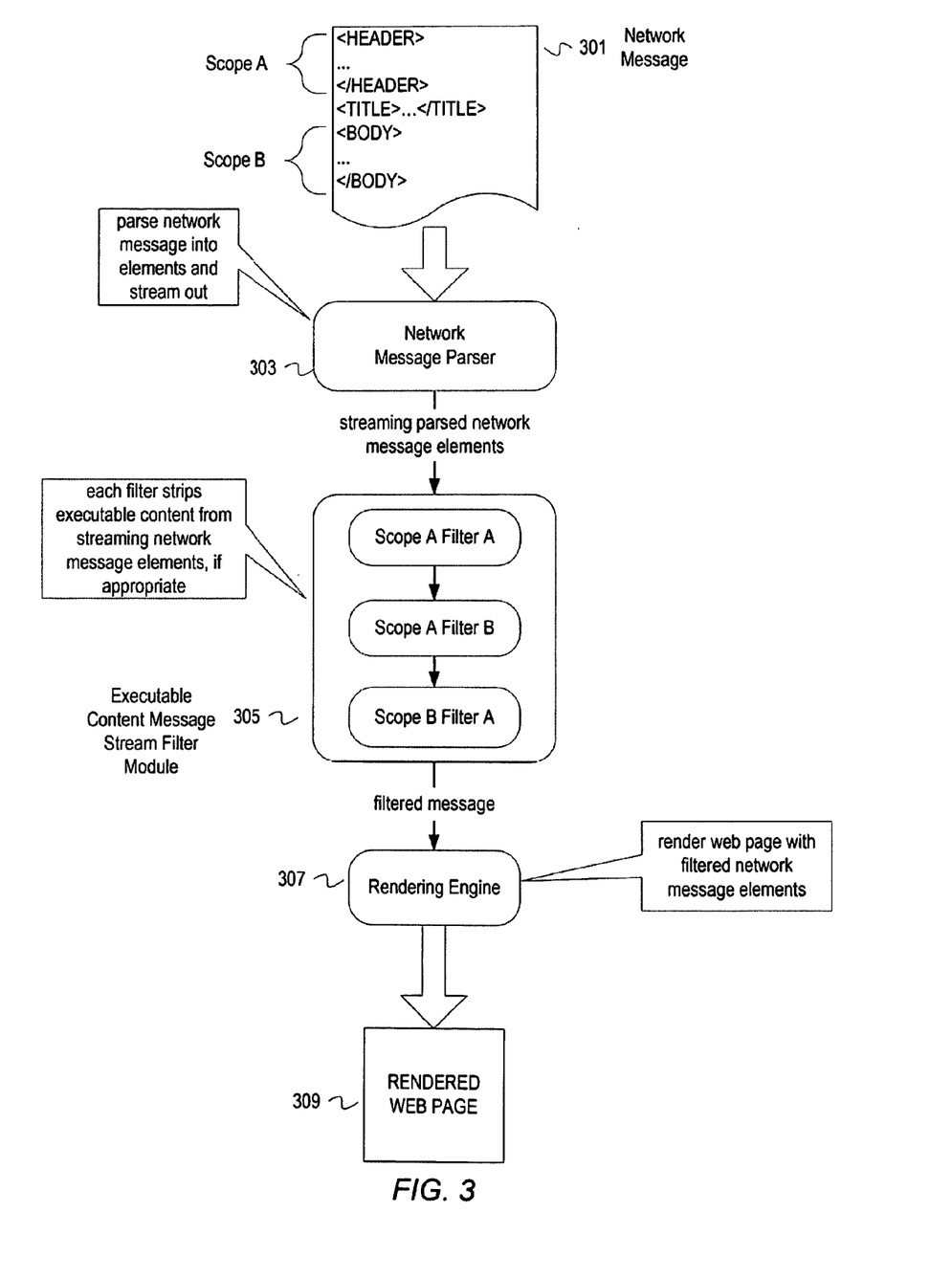
FIG. 3 depicts a conceptual example of filtering a response type network message.

FIG. 3 depicts a conceptual example of filtering a response type network message. A network message parser 303 parses a response type network message 301. In the example illustrated with FIG. 3, the response type network message 301 is encoded according to a markup language. The network message parser 303 streams out parsed elements of the message 301 to an executable content message stream filter module 305.

The executable content message stream filter module 305 comprises three filters. The framework for the executable content message stream filter module 305 is flexible and extensible. Any number of rule sets can be used for filtering messages. In addition, the configuration file(s) can be modified to add, modify, and or delete rule sets. Each of the filters strips executable content from the streaming parsed elements, if appropriate. Each filter strips executable content in accordance with the rule set being implemented, and within a scope of the message defined for the corresponding rule. First and second filters examine parsed elements that correspond to a scope A. In this illustration, scope A encompasses the header of the message 301. Hence, the first and the second filters implement rule sets that target the header of the message 301. A third filter implements a rule set that targets a scope B. In this illustration, scope B encompasses the body of the message 301.

In the example response message configuration file discussed above, ruleset1 is defined for a scope "/html/body," and ruleset2 is defined for a scope "/html/header." A filter implementing ruleset1 will evaluate parsed elements from the body portion of a network message against the filter rules of ruleset1. A filter implementing ruleset2 will evaluate parsed elements from the header portion of the network message against the filter rules of ruleset2.

The filtered version of the message 301 is output from the executable content message stream filter module 305 to eventually be received by a rendering engine 307, which renders a web page 309 with the filtered version of the message 301. The filtered version of the message 301 may traverse a network prior to reaching the rendering engine 307.

Malicious executable content can be injected into a message with various techniques. The following are examples of different modifications to response type network messages to remove potentially malicious executable content.

Removing Executable Content Injected into Text

```
<body>
<style>.bar{background-image:url("javascript:alert('JavaScript')");}
</style>
<br>
</body>
```

```
<body>
<br>
</body>
```

Removing Executable Content Injected into an Attribute Value

```
<body>
<img sec=javascript:alert("3");>
<LINK rel="stylesheet" href="javascript:alert('hello');">
</body>
```

```
<body><img src="">
<LINK rel="stylesheet" href="">
</body>
```

Removing Encoded Executable Content

```
<body>
<img src=javascr 05;p
t:al 01; ;rt('X
SS'#41;>
```

```
</body>
⇩
<body>
<img src="">
</body>
```

Removing Executable Content in a Tag

```
<body> <script src="a.js"></script>
<br>
</body>
⇩
<body>
<br>
</body>
```

The depicted executable content message stream filter modules can be implemented on a server, client, proxy, both a server and a client, etc. A server can remove executable content from request type network message before processing, and remove executable content from response type network message before transmitting. The server may be an interim network element or the source of the response type network message. In another embodiment, a client filters request type network messages before transmitting, and filters response type network messages before processing. In another embodiment, a server may filter request type network messages and a client may filter response type network messages. In addition, the example executable content message stream filter modules can be implemented with the application aware of message content, as a separate application in communication with the application aware of message content, etc.

Figure 4:
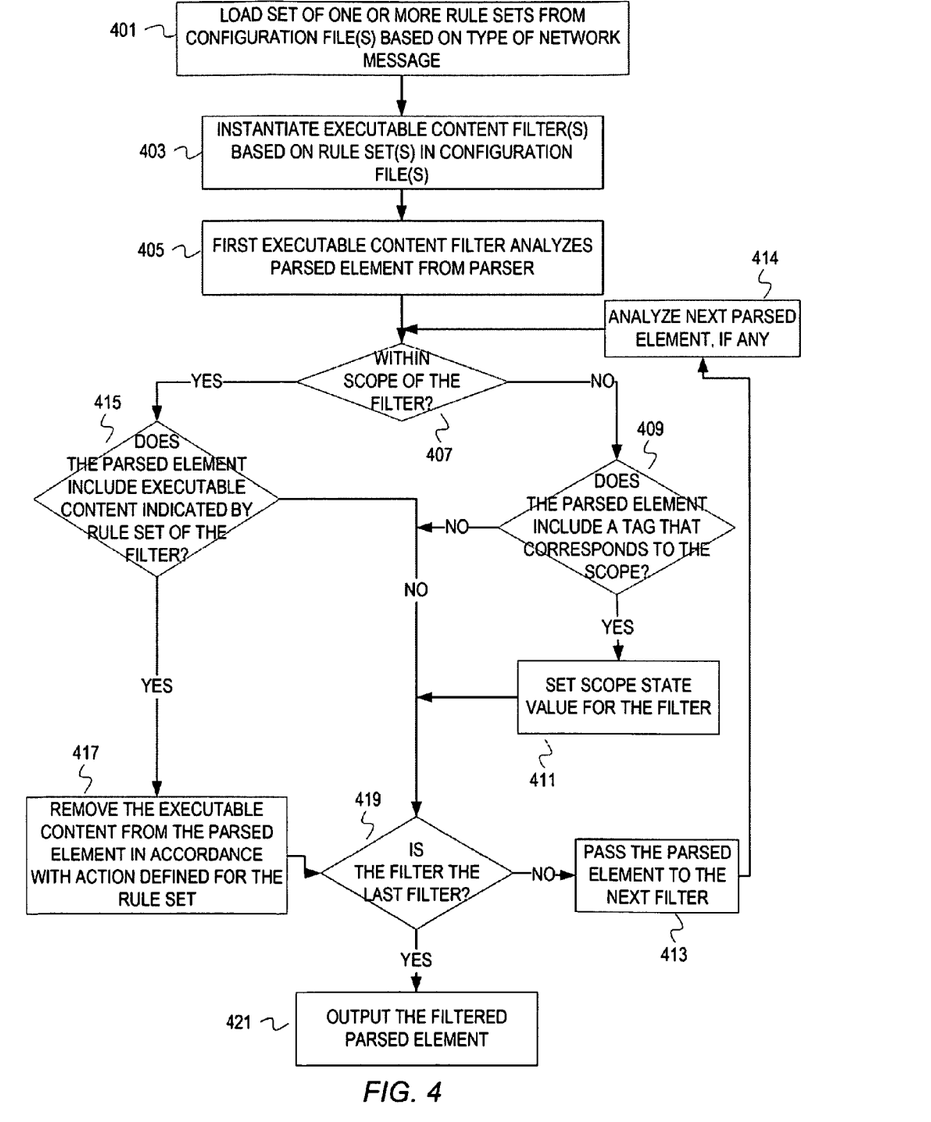
FIG. 4 depicts a flowchart of example operations for filtering messages based on scope of a rule set.

FIG. 4 depicts a flowchart of example operations for filtering messages based on scope of a rule set. At block 401, a set of one or more rules are loaded from a configuration file(s) based on a type of network message. At block 403, one or more executable content filters are instantiated based on the loaded rule sets. At block 405, a first executable content filter analyzes a parsed element pushed from a parser or pulled from a parser or parser output queue. At block 407, it is determined if the parsed element is within a scope of the rule set implemented with the executable content filter. For instance, an embodiment maintains a state machine or value that represents current scope of the parsed element stream. If the parsed element is within the scope of the filter, then control flows to block 415. If the parsed element is not within the scope of the filter, then control flows to block 409.

At block 415, it is determined if the parsed element includes executable content indicated by the filter. If so, then control flows to block 417. If not, then control flows to block 419.

At block 417, the executable content is removed from the parsed element in accordance with the action(s) defined for the rule set. If a rule set comprises multiple filter rules, then an action will be performed for each of the filter rules. Control flows from block 417 to block 419.

At block 419, it is determined if the executable content filter is the last filter. If it is the last filter, then control flows to block 421. If the filter is not the last filter, then control flows to block 413.

At block 421, the filtered parsed element is output.

At block 413, the parsed element is passed to the next filter. At block 414, the next parsed element from the parser, if any, is analyzed.

If it was determined at block 407 that the parsed element was not within the scope of the filter, then it is determined if the parsed element includes a tag that corresponds to the scope at block 409. If the parsed element includes a tag that corresponds to the scope, then control flows to block 411. If the parsed element does not include a tag that corresponds to the scope, then control flows to block 419.

At block 411, a scope state value is set for the filter. For example, a filter that operates within a scope A/B/C can increment a scope state value when it sees <A>, <B>, and <C>. When the scope state value reaches three, then the filter begins applying the corresponding rule set. If the filter sees <A>, <B>, then </B>, the filter can decrement the state value to represent being within A since scope B was terminated before entering scope C. Control flows from block 411 to block 419.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 2, the configuration file may be preloaded into memory, and/or the filters already instantiated. In addition, some embodiments may mark executable content for removal, but postpone removal until later filters have analyzed the parsed elements. Marking executable content for removal can be useful to avoid confusing later executable content filters.

Different embodiments can utilize different hardware and/or platforms (e.g., multi-processor systems, multi-core processor architectures, multi-threaded platforms, etc.) for a myriad of executable content filter architectures. For example, a first thread can implement a parser, while one or more other threads implement executable content filters. Furthermore, different threads can be tasked with different scopes.

Figure 5:
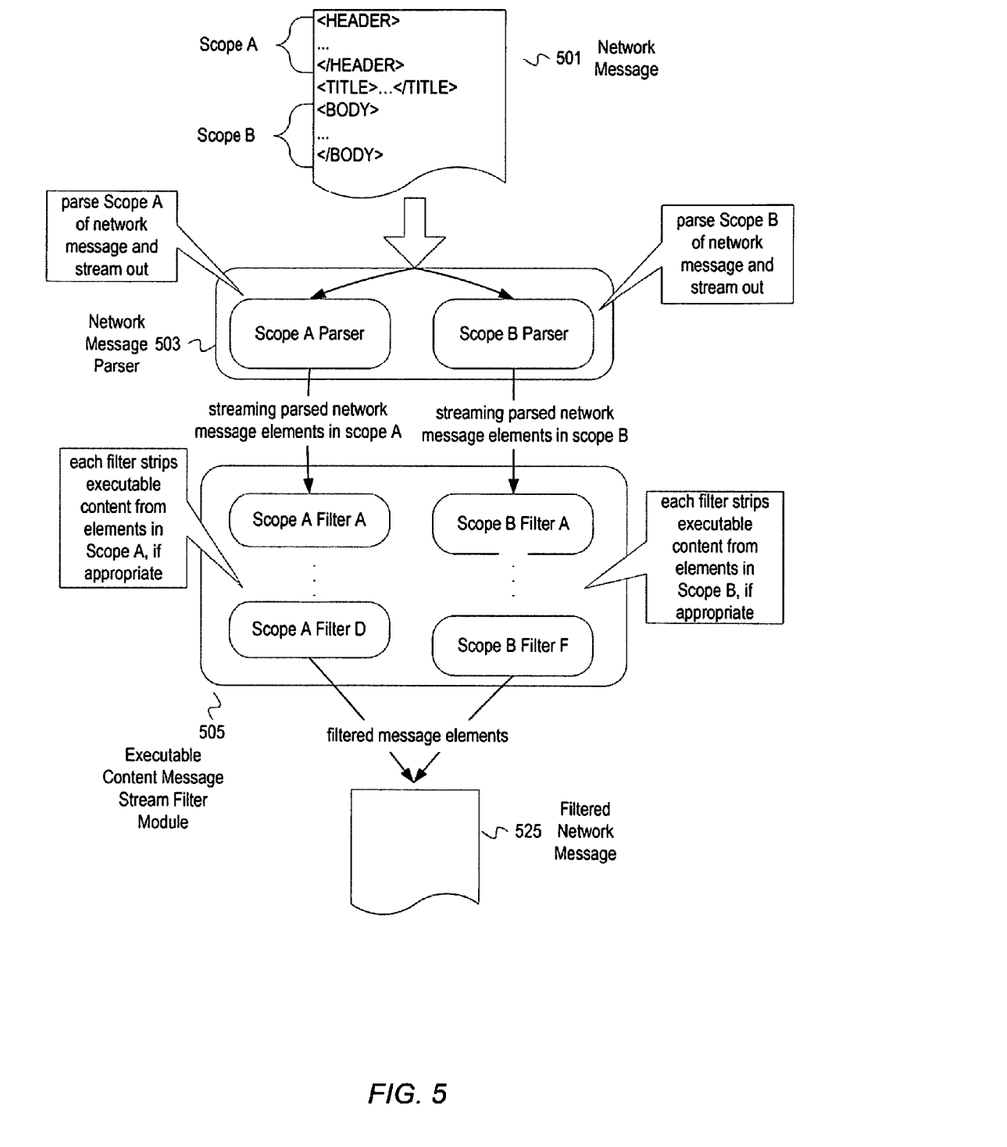
FIG. 5 depicts a conceptual example of different threads handling different scopes of rule sets.

FIG. 5 depicts a conceptual example of different threads handling different scopes of rule sets. A network message parser 503 comprises a thread parsing scope A of a network message 501, and a thread parsing scope B of the network message 501. In this illustration, scope A corresponds to a header portion of a response type network message and scope B corresponds to a body portion of a response type network message. An executable content message stream filter module 505 comprises several threads. A first set of threads implements rule sets that apply to scope A. A second set of threads apply to rule sets that apply to scope B. The first set of threads apply rule sets A through D to the stream of parsed element output from the scope A parser thread to strip the appropriate executable content from scope A parsed elements. The second set of threads applies rule sets A through F to the parsed elements output from the scope B parser thread to strip the appropriate executable content from the scope B parsed elements. The filtered parsed elements are eventually aggregated to form a filtered network message 525. In some embodiments, the executable content message stream filter module 505 includes functionality to form the filtered network message 525 from the filtered parsed element output by the filters. In some embodiments, a separate software and/or hardware component forms a message from filtered parsed elements output from the executable content message stream filter module 505.

Although examples have been described that read tags to identify scope, embodiments can use annotations to indicate scope. When a document is prepared that will be included in a network message (e.g., a markup language document), annotation can be written into the document to define scope and guide executable content filters. For example, the following can be used to specify a scope for filtering of all contents in an HTML body:

```
Writer writer = ....; //An output stream writer to pass the
response HTML page to clients
writer.write("<html>");
writer.write("<head>");
writer.write(......");
writer.write("</head>");
writer.write("<!-- ACFscopeStart-af3D...-->");
writer.write("<body>");
writer.writer("...");
writer.write("</body>");
writer.write("<!-- ACFscopeEnd-af3D...-->");
writer.write("</html>");
```

In the above example, the "<!—ACFscopeStart-af3D . . . —>" annotation is used to specify a starting point for filtering and the "<!—ACFscopeEnd-af3D . . . —>" annotation is used to specify end of the scope for filtering. The annotations may include security value, such as a secure random number or a hash value, in order to make it difficult for anyone to guess what annotation is used in the system. In the above example, "af3D . . . " is used as the security value. Multiple annotations can be embedded to specify different scopes within a document. Although the example uses comments to embed the annotation, other techniques can be used to embed annotations. For instance, an XML tag can be defined to specify start and end of a particular scope. In addition, annotations for both start and end of a scope need not be embedded. An annotation can be embedded to identify start of a scope, and the end can be implicit.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
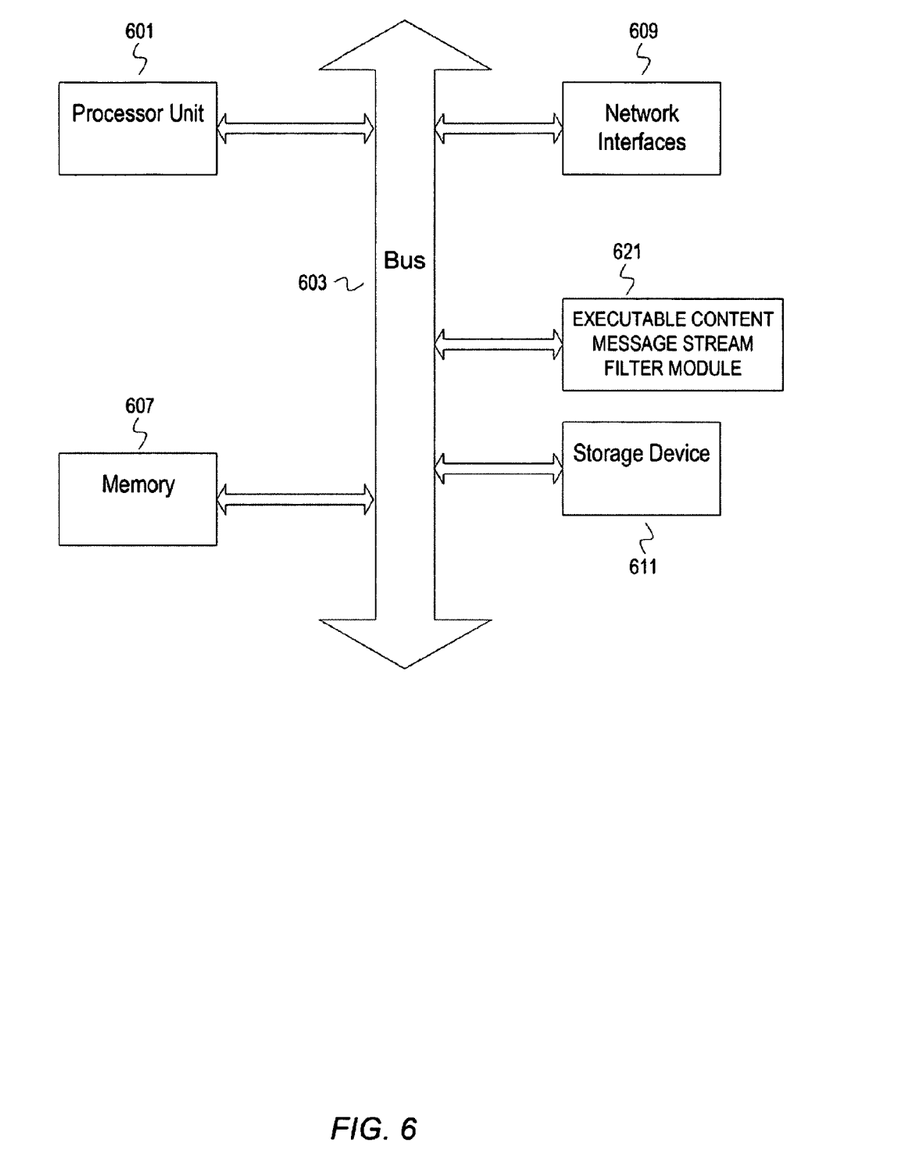
FIG. 6 depicts an example computer system.

FIG. 6 depicts an example computer system. A computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 609 (e.g., an ATM interface, an Ethernet interface, a Frame Relay interface, SONET interface, wireless interface, etc.), and a storage device(s) 611 (e.g., optical storage, magnetic storage, etc.). The example computer system also comprises an executable content message stream filter module 621 that performs at least some of the functionality described above for identifying and removing executable content from network messages. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, a field programmable gate array, etc. Further, realizations may include fewer or additional components not illustrated in FIG. 6 (e.g., video cards, audio cards, additional network interfaces, peripheral devices, etc.). The processor unit 601, the storage device(s) 611, the executable content message stream filter module 621, and the network interface 609 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. For instance, although the examples refer to removing executable content, embodiments are not so limited. Embodiments can modify a stream of parsed elements of a network message to effectively remove executable content from the network message. Example techniques for effectively removing or disabling executable content include anonymizing, hiding, rewriting, etc. In general, techniques for executable content filtering as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    analyzing a stream of one or more parsed elements of a network message with a set of one or more executable content filters, wherein the stream of one or more parsed elements are streamed from a network message parser; and
    modifying the stream of one or more parsed elements to disable executable content in the network message based, at least in part, on a set of one or more rule sets being applied with the set of one or more executable content filters to the stream of one or more parsed elements, wherein the set of one or more rule sets is selected based, at least in part, on a type of the network message.

2. The method of claim 1, wherein said modifying the stream of one or more parsed elements comprises
    marking the executable content for removal.

3. The method of claim 1 further comprising:
    accessing a set of one or more executable content filtering configuration files that indicate the set of one or more rule sets; and
    instantiating the set of one or more executable content filters based on the set of one or more rule sets.

4. The method of claim 1, wherein each of the set of one or more rule sets applies to a particular scope of the network message.

5. The method of claim 1, wherein said analyzing comprises:
    determining a scope of the network message based on the stream of one or more elements;
    modifying a first of the one or more parsed elements to disable executable content indicated by a first of the set of one or more rule sets if the first parsed element is within the scope and if the first parsed element includes the executable content indicated by the first rule set; and
    passing the first parsed element to a second executable content filter if not modified by the first executable content filter or if the first parsed element is not within the scope.

6. The method of claim 5, wherein said determining the scope comprises:
    detecting in the stream of parsed elements a first tag that marks a beginning of the scope; and
    setting a value for the first executable content filter to indicate the stream is within the scope.

7. The method of claim 5, wherein said determining the scope comprises:
    detecting an embedded annotation that specifies the scope.

8. The method of claim 1, wherein a first of the set of one or more rule sets comprises one or more filtering rules, wherein a first of the one or more filtering rules indicates an attribute being filtered, a value for the attribute, a criteria for applying the first filter rule, and an action to be taken if the first filter rule applies.

9. The method of claim 1, wherein a first of the set of one or more rule sets comprises one or more filtering rules, wherein a first of the one or more filtering rules indicates a tag to be filtered, and an action that specifies removal of the tag.

10. A method comprising:
    applying a plurality of executable content filters to a stream of parsed elements of a network message, wherein each of the plurality of executable content filters targets executable content and is instantiated based on a set of one or more rule sets selected based, at least in part, on a type of the network message;
    for each of the plurality of executable content filters, determining if one or more of the stream of parsed elements includes executable content targeted by the executable content filter; and
    modifying those of the stream of parsed elements that include the executable content targeted by the plurality of executable content filters to disable the executable content.

11. The method of claim 10 further comprising:
    for each of the plurality of executable content filters, analyzing the stream of parsed elements for those of the parsed elements within a scope of the network message analyzed by the executable content filter, wherein said determining is contingent upon the parsed elements being within the scope.

12. The method of claim 10, wherein said modifying those of the stream of parsed elements that include the executable content targeted by the plurality of executable content filters comprises marking the executable content for removal after said applying.

13. The method of claim 10, wherein said applying comprises applying a first set of the plurality of executable content filters in parallel with a second set of the plurality of executable content filters, wherein the first and the second set of executable content filters correspond to different scopes of the network message.

14. The method of claim 10, wherein said applying comprises applying the plurality of executable content filters in series.

15. The method of claim 10, wherein the executable content targeted by the plurality of executable content filters comprises at least one of a tag, a parameter value, an attribute value, and encoded content.

16. One or more non-transitory machine-readable media having stored therein a program product, which when executed a set of one or more processor units causes the set of one or more processor units to perform operations that comprise:
    analyzing a stream of one or more parsed elements of a network message with a set of one or more executable content filters, wherein the stream of one or more parsed elements are streamed from a network message parser; and
    modifying the stream of one or more parsed elements to disable executable content in the network message based, at least in part, on a set of one or more rule sets applied with the set of one or more executable content filters to the stream of one or more parsed elements, wherein the set of one or more rule sets is selected based, at least in part, on a type of the network message.

17. The non-transitory machine-readable media of claim 16, wherein the operations further comprise:
    loading a set of one or more executable content filtering configuration files that indicate the set of one or more rule sets; and
    instantiating the set of one or more executable content filters based on the set of one or more rule sets.

18. An apparatus comprising:
a set of one or more processor units;
a network interface operable to receive a network message and coupled with the set of one or more processor units; and
an executable content message stream filter module coupled with the network interface, the executable content message filter module operable to,
analyze a stream of one or more parsed elements of a network message with a set of one or more executable content filters, wherein the stream of one or more parsed elements are streamed from a network message parser, and
modify the stream of one or more parsed elements to disable executable content in the network message in accordance with a set of one or more rules sets applied with the set of one or more executable content filters to the stream of one or more parsed elements, wherein the set of one or more rule sets is selected based, at least in part, on a type of the network message.

19. The apparatus of claim 18 further comprising the network message parser coupled with the executable content message stream filter module and operable to parse the network message into the one or more parsed elements and operable to stream out the one or more parsed elements.

20. The apparatus of claim 18, wherein the executable content message stream filter module is further operable to load a configuration file that indicates the set of one or more rule sets and operable to instantiate the set of one or more executable content filters based on the set of one or more rule sets.

* * * * *